(No Model.) 5 Sheets—Sheet 3.
A. D. OSGOOD.
CORN HARVESTER ATTACHMENT FOR WAGONS.
No. 350,443. Patented Oct. 5, 1886.
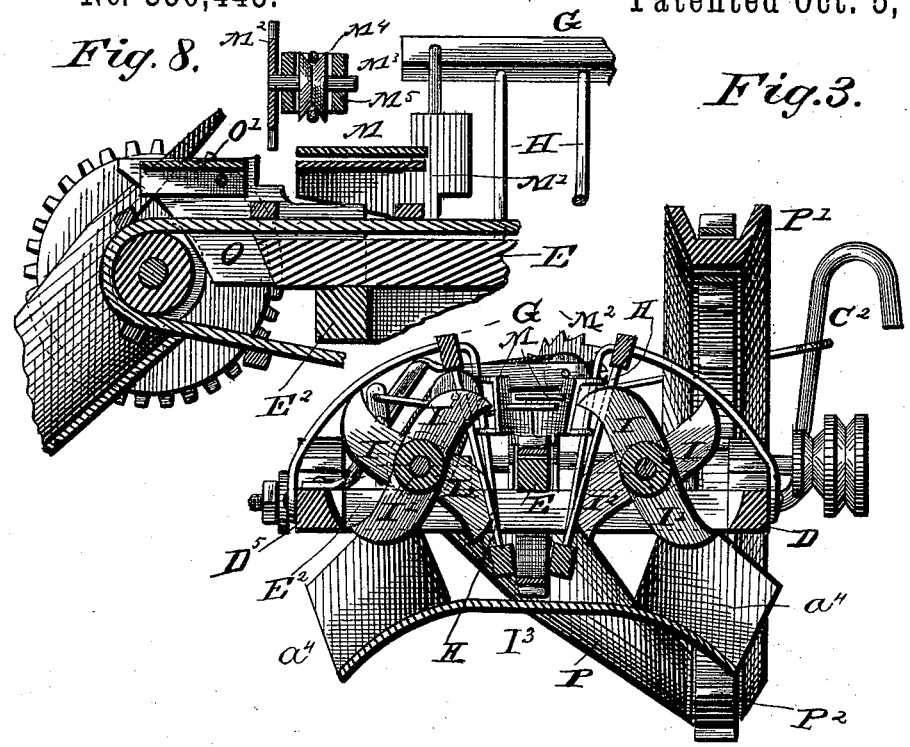
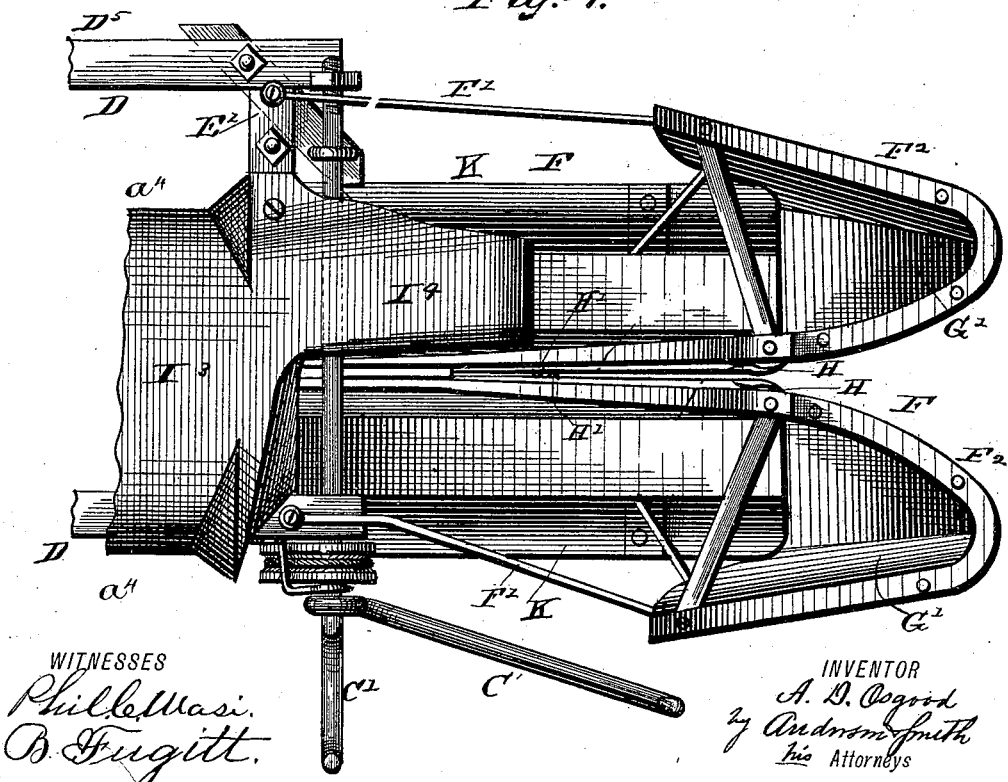
WITNESSES
Phille Masi.
B. Fugitt.
INVENTOR
A. D. Osgood
by Anderson Smith
his Attorneys (No Model.) 5 Sheets—Sheet 4.
A. D. OSGOOD.
CORN HARVESTER ATTACHMENT FOR WAGONS.
No. 350,443. Patented Oct. 5, 1886.
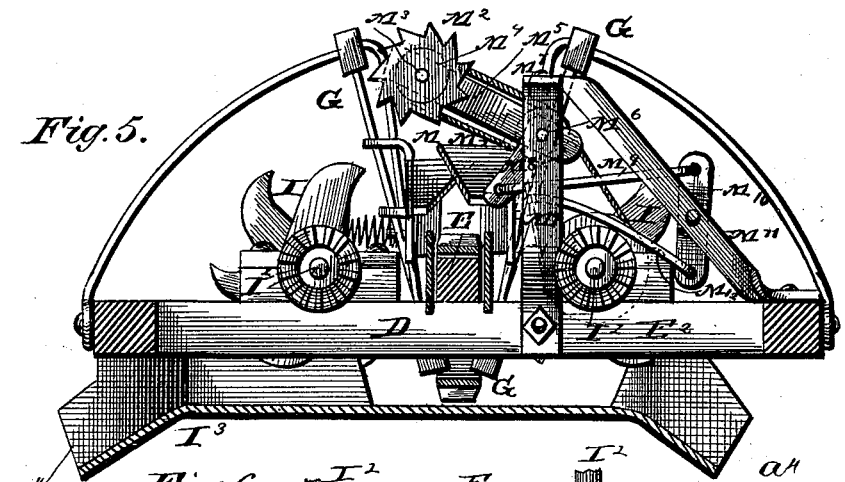
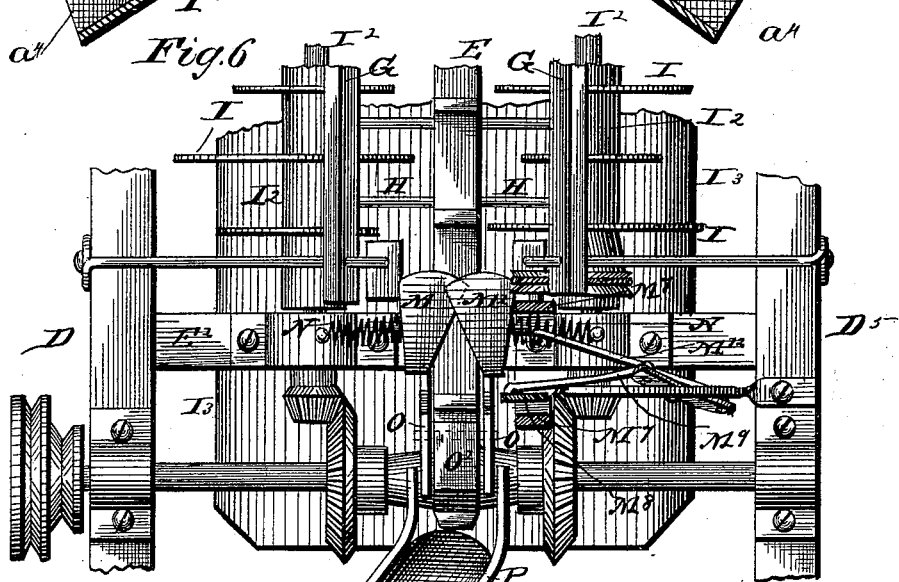
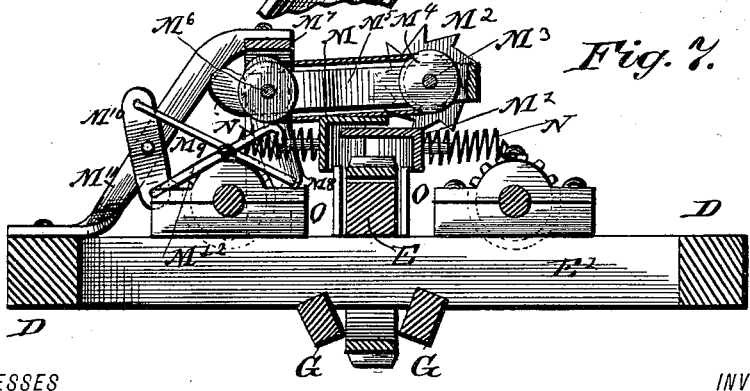
WITNESSES
INVENTOR (No Model.) 5 Sheets—Sheet 5.
A. D. OSGOOD.
CORN HARVESTER ATTACHMENT FOR WAGONS.
No. 350,443. Patented Oct. 5, 1886.
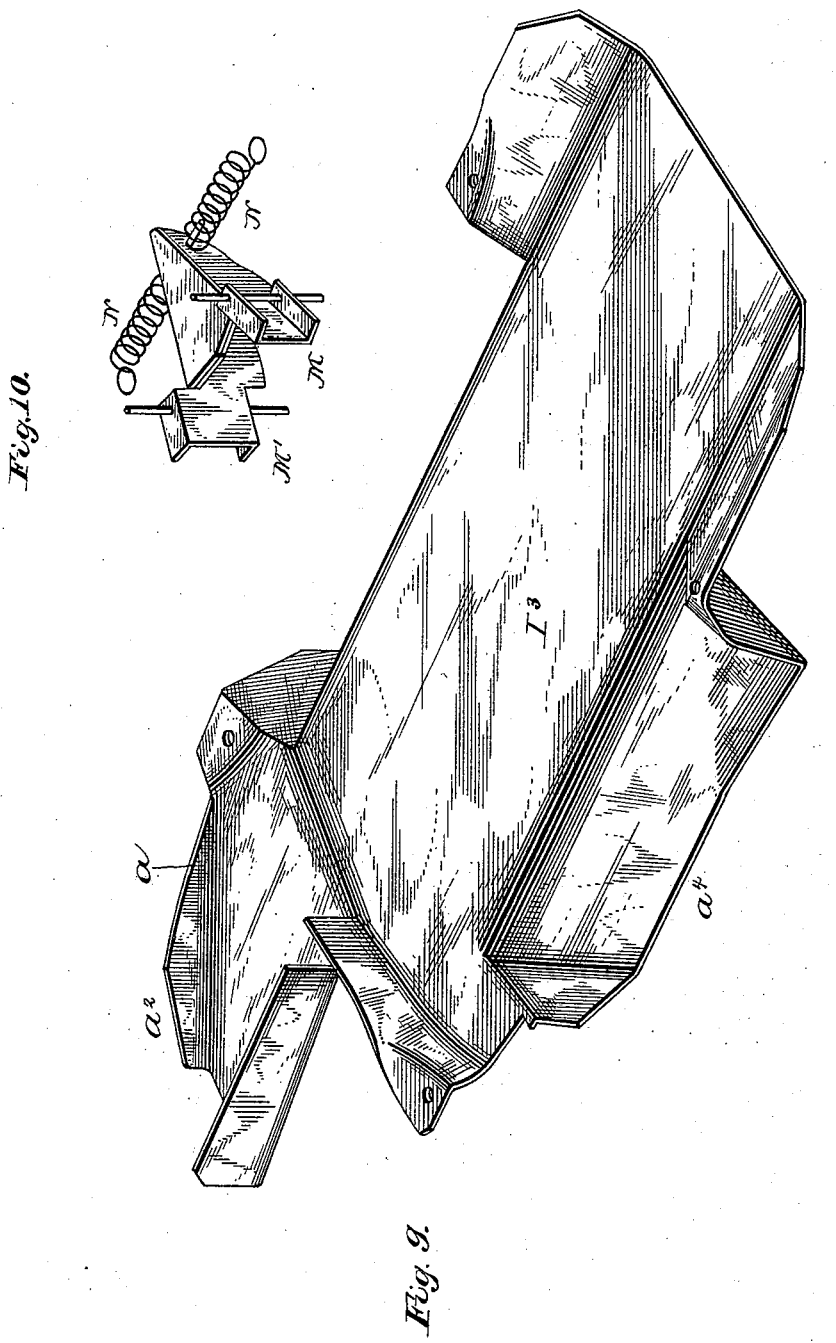
WITNESSES
INVENTOR
Albert D. Osgood
By Anderson & Smith
ATTORNEYS ated October 5, 1886.

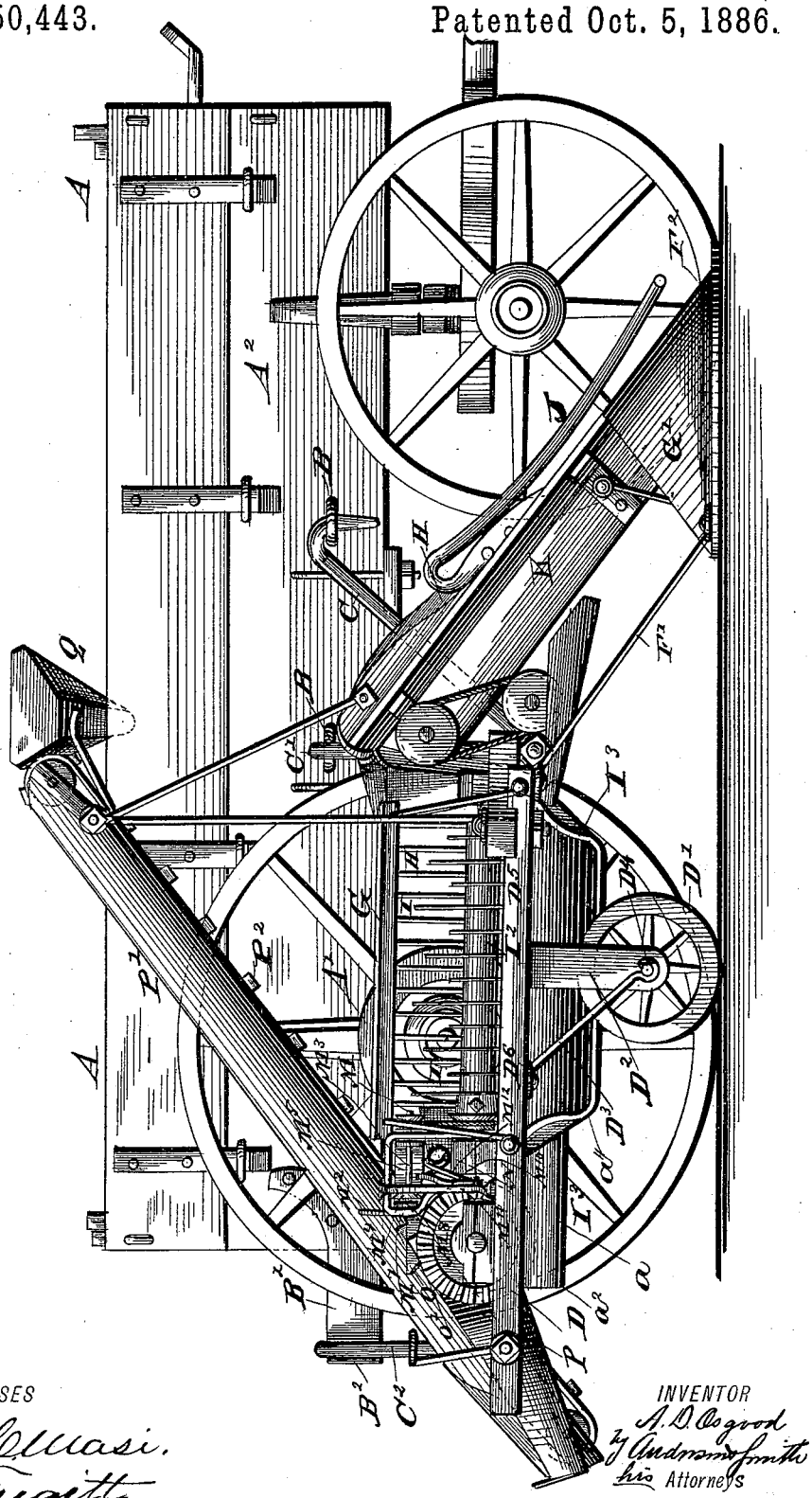

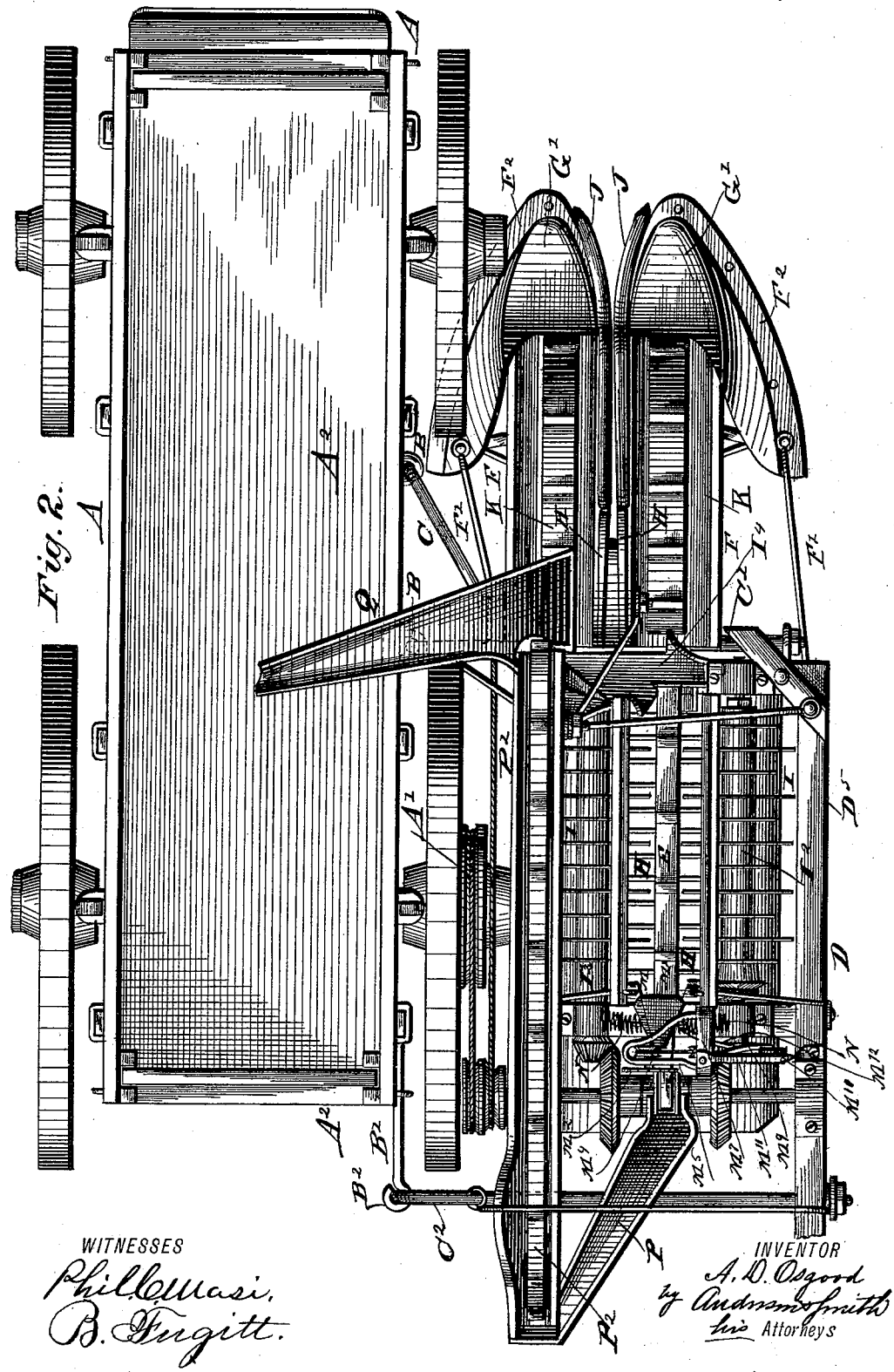

UNITED STATES PATENT OFFICE.

ALBERT DAVID OSGOOD, OF PLYMOUTH, NEBRASKA.

CORN-HARVESTER ATTACHMENT FOR WAGONS.

SPECIFICATION forming part of Letters Patent No. 350,443, dated October 5, 1886.

Application filed September 10, 1885. Serial No. 176,701. (No model.)

*To all whom it may concern:*

Be it known that I, ALBERT DAVID OSGOOD, a citizen of the United States, residing at Plymouth, in the county of Jefferson and State of Nebraska, have invented certain new and useful Improvements in Corn-Harvesting Attachments to Wagons; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of a side elevation. Fig. 2 is a top or plan view. Fig. 3 is an enlarged sectional view. Fig. 4 is a portion of an enlarged bottom view. Fig. 5 is a rear elevation, partly in section. Fig. 6 is a portion of a plan view, partly in section. Fig. 7 is an enlarged transverse sectional view. Fig. 8 is an enlarged detail vertical sectional view. Fig. 9 is a perspective view of a metallic guard removed from the machine, and Fig. 10 is a perspective view of the jaws M M.

My invention relates to corn-harvesting attachments for wagons; and it consists in the construction and novel combination of parts, as will be hereinafter fully described, and particularly pointed out in the claims.

Referring by letter to the accompanying drawings, A designates a wagon, one of the rear wheels of which is provided on its outer face around the hub with a grooved ring or pulley, A', which converts this wheel into the driving-wheel for driving the harvester attachment. At one side the wagon-box $A^2$ is provided with two eyebolts, B B, and a rearwardly-extending arm, B', with an eye, $B^2$, at the rear end of said arm, and these eyebolts and eyes are engaged by hooks on the upper ends of the arms C C' $C^2$, said arms extending from the inner side of the frame D of the corn-harvester attachment. These arms C C' $C^2$ extend inwardly and upwardly from the frame of the corn-harvester attachment, and the front arm, C, extends forward therefrom, as shown. At its outer side the frame D of the corn-harvester attachment is provided with a supporting-wheel, D', which is journaled between two depending arms, $D^2$ $D^2$, the latter being braced by a bent rod, $D^3$, which engages the journal $D^4$ of the supporting-wheel D', and is secured at its upper end to the under face of the outer beam, $D^5$, of the frame of the harvester attachment by a bolt, $D^6$. The frame of the attachment is provided at its longitudinal middle with a guide-bar, E, which extends from the front cross bar, E', to the rear cross-bar, $E^2$, of the frame of the attachment, and forms the bottom of the crib G, through which the pulled ears of corn are carried to the cutting-saws, which latter snap or cut the stems of the ears of corn. The guide-bar E forms the bottom of the crib, although said bar is slightly above the lower rails of the crib. The upper and lower rails of the crib G are connected by rods H, having spaces between them, through which spaces the cutters or knives I are projected when the cutter-shafts I' are revolved. The knives I are separated on the cutter-shafts I' I' by spools $I^2$, and the blades of the knives project radially from said shafts and at such a variety of angles that they cut successively, and not all at one time, when operated. The attachment is provided with a sheet-metal guard, $I^3$, below the cutters, which prevents weeds, &c., from coming in contact with the knives when the machine is being drawn over the field, and also protects the front end of the horizontal carrier from contact with the weeds, &c. This guard has its forward end, a, extended in reduced form, as shown, to pass beneath the forward portion of the endless carrier and its operating-pulleys to guard the same. The opposite end is also extended, and bent so as to guard the gearing for operating the cutter-knives of the rotating shafts. From the longitudinal sides of this guard or plate $I^3$ are lateral chutes $a^4$ $a^4$, which are designed to carry off the leaves as they are cut from the stalks. To the front end of the frame of the attachment an inclined double elevator, F, is connected, and is held in position by braces F' F', connected with the wings of the elevator-shoes G' G', and extending rearwardly and upwardly, and connecting with the under side of the attachment-frame at its front end. From the front end of the attachment extend two angular braces, H H, which are secured at their rear ends by bolts H'. These braces H H are inclined, and extend downwardly and forwardly between the sections of the double elevator F, and at their forward ends said braces are provided with frames F² F², of irregular form, to the upper faces of which the shoes or plows G' G' are bolted. To the inclined braces H H, at about the middle of their length, are secured two bent diverging guides or arms, J J, between which the ears of corn enter, and by which the ears of corn are pulled from the stalk and permitted to fall upon the elevating-bolts K K in the inclined double elevator. At the rear end of the double elevator is an inclined trough or chute, I⁴, which directs the plucked ears of corn to the horizontal carrier between the rotary knives. At the rear end of the crib, and directly over the horizontal carrier, are two hinged tapering jaws, M M', which are held normally closed by coil-springs N. At the exit end of these jaws M M' is a saw, M², which is secured to an arbor, M³, provided with a pulley, M⁴, and journaled in a frame, M⁵, pivoted on a shaft, M⁶, the latter having bearings in a frame, M⁷, at the rear of and at one side of the crib G. The pivoted frame M⁵ is provided with a downwardly-extending arm, M⁸, the lower end of which arm M⁸ is connected by a rod, M⁹, with the upper end of a lever, M¹⁰, pivoted to the inclined brace M¹¹. The lower end of the lever M¹⁰ is connected by a rod, M¹², to the pivoted jaw M. By this construction, when an ear of corn is passed through the jaws M M', after the knives have loosened the husk, the saw M² will first cut the silk from the ear, and the endless horizontal carrier will convey the ear through between the jaws M M', which, as said jaws are opened by the passing ear, will elevate the saw through the media of the connecting-rod secured thereto, and permit the ear of corn to be passed under the saw into a guideway, O, having a pivoted clamping top, O', which serves to hold the ear of corn in the guideway until the stem of the ear has been cut off by the saw, which is let down as soon as the ear of corn leaves the jaw M M'. The ear of corn is carried from the clamping top O by the horizontal endless carrier engaging therewith. After the ear of corn leaves the way O it descends a trough or chute, P, and enters the lower end of an upwardly-inclined elevator-trough, P', which is provided with an endless carrier, P², which latter carries the ear of corn up to the top of said elevator-trough P, where it enters a chute, Q, extending at right angles from the trough over the wagon-box, and directs the ear of corn into the wagon-box. As soon as one wagon is loaded the corn-harvester attachment is detached from the loaded wagon and is connected to an unloaded wagon, having the wagon-box prepared for being connected therewith in a manner similar to the wagon-box hereinbefore described.

Having described this invention, what I claim, and desire to secure by Letters Patent, is—

1. The combination, with the attachment-frame having the supporting-wheel at one side, the crib, and the horizontal carrier in the bottom of the crib, of the double elevator with the elevating-shoes and plucking-arms, the guide-trough connecting the elevator and crib, the elevating-carrier and elevating-chute, and the husking-blades and stemming and silking saw, substantially as specified.

2. The combination, with the double elevator, the plucking-arms, crib, and horizontal carrier, of the rotary shafts provided with husking-blades separated by spools, the pivoted clamping-guides, and the stemming and silking saw, substantially as set forth.

3. The combination, with the attachment-frame, crib, horizontal carrier, and husking-blades, of the sheet-metal guard beneath the horizontal carrier and husking-blades, as set forth.

4. The combination, with the double elevator having the lifting-plows at the front ends thereof, of the plucking-arms, the trough for conveying the ears to the crib, the crib, the cutting-blades, the silking and stemming saws, the rear chute, the elevating-carrier, and the delivery-chute at the upper end of the latter, as set forth.

5. The combination, with the horizontal carrier and husking-blades, of the silking and stemming saw and the clamp-guide in rear of the latter, substantially as specified.

In testimony whereof I affix my signature in presence of two witnesses.

ALBERT DAVID OSGOOD.

Witnesses:
 GEO. R. PAYNE,
 W. M. HAMILTON.